June 28, 1932.  F. EHRENHARDT  1,865,361
PRODUCE BASKET FILLING DEVICE
Filed May 7, 1929   2 Sheets-Sheet 2
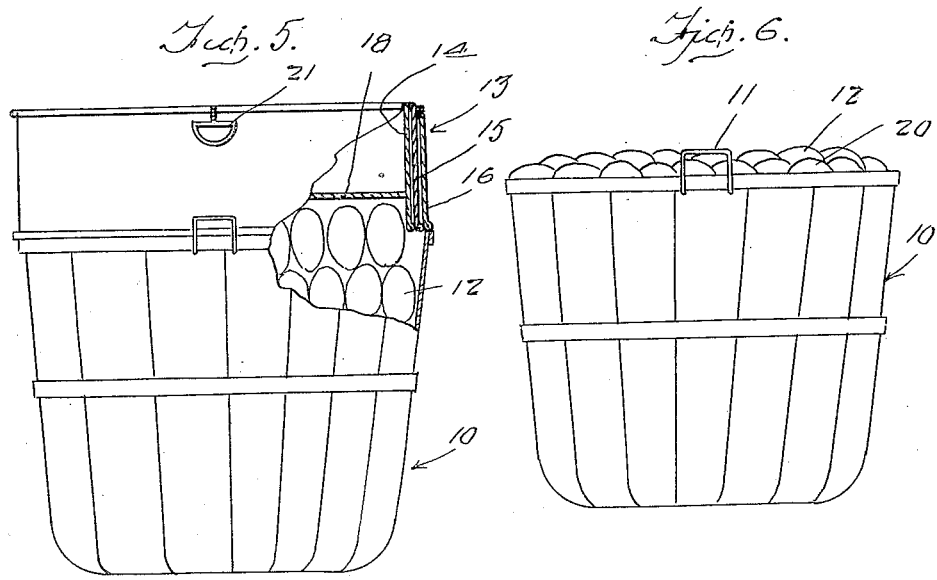
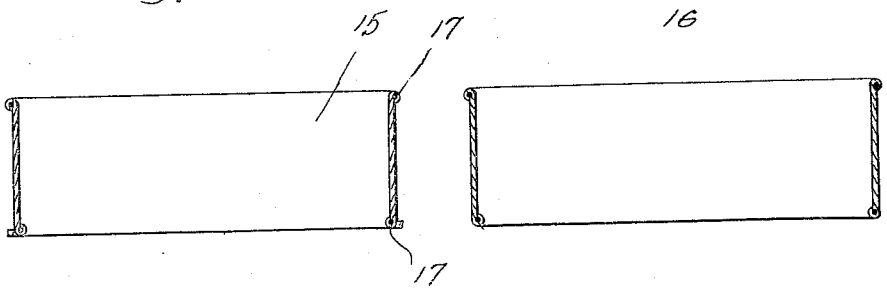
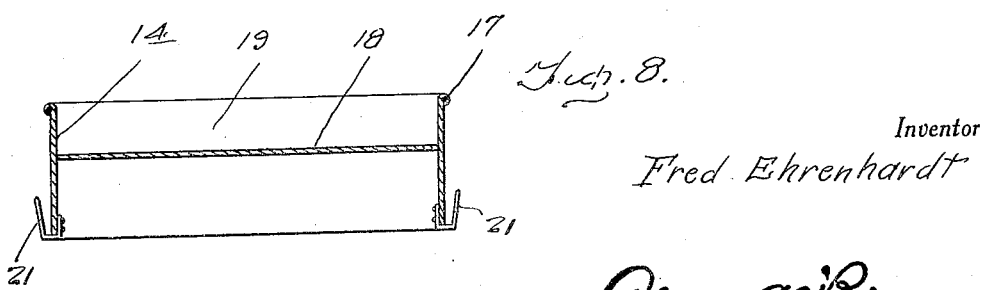
Inventor
Fred Ehrenhardt
By Clarence A. O'Brien
Attorney Patented June 28, 1932

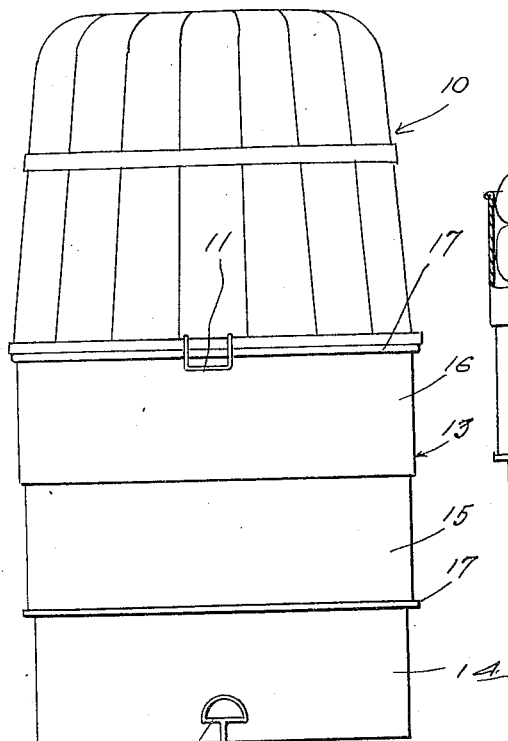
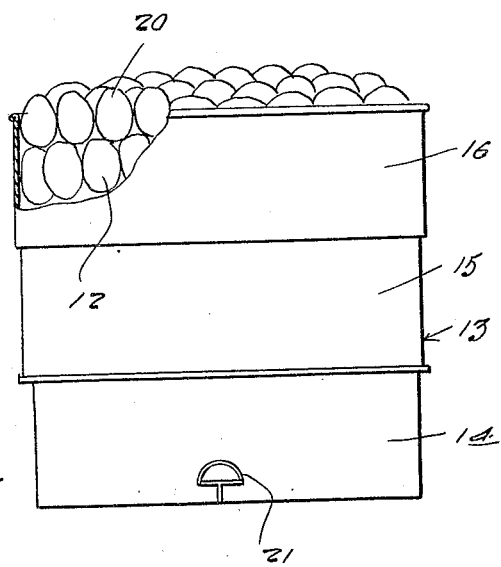
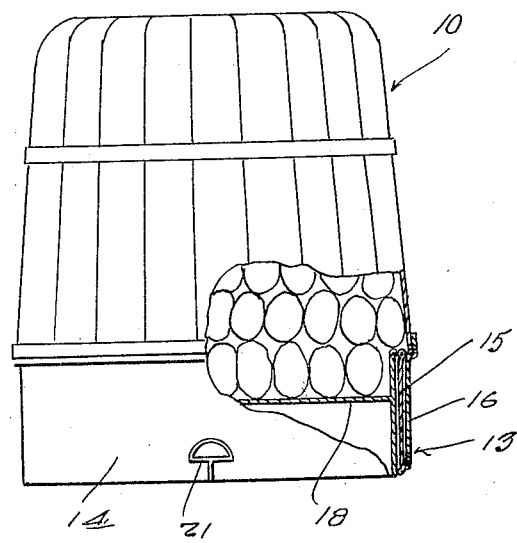
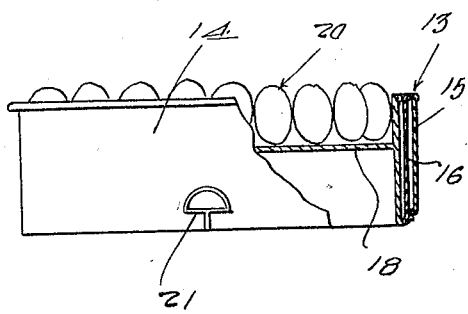
Inventor
Fred Ehrenhardt

1,865,361

UNITED STATES PATENT OFFICE

FRED EHRENHARDT, OF LOCKPORT, NEW YORK

PRODUCE BASKET FILLING DEVICE

Application filed May 7, 1929. Serial No. 361,150.

This invention relates to an improved hopper filling device for filling and packing bushel baskets and the like, such as are employed for containing and shipping various articles of garden produce, such as fruits, vegetables and the like.

At the present time, it is customary to employ for this purpose specially constructed hoppers with which liners are used to facilitate the basket filling operation.

These liners, I have found, are rather costly and are objectionable, in that when they are disposed in the basket, poor ventilation results.

It is an important object of my invention, to provide means whereby these objectionable liners are dispensed with entirely in the form of collapsible hopper designed to be utilized in systemmatically filling the baskets and at the same time providing an attractive top layer of fruit or vegetables.

Other objects and advantages of my invention will appear from the following description and the drawings.

In the drawings:

Figure 1 is an elevational and sectional view showing a hopper constructed in accordance with the invention with the parts in a telescoped, collapsed relation.

Figure 2 is a similar view showing the sections of the hopper extended.

Figure 3 is a view like Figure 2, showing the manner of associating a basket therewith.

Figure 4 is a view similar to Figure 3, except that it shows the position of the basket forced down so as to have projected the contents from the hopper into the basket.

Figure 5 shows the structure seen in Figure 4 inverted and ready for removal of the hopper.

Figure 6 shows the basket filled and ready for reception of the usual lid or cover.

Figures 7, 8 and 9 show the rings employed in constructing the collapsible hopper.

In the drawings, in Figure 6, the reference character 10 designates an ordinary bushel basket having the handles 11. The reference character 12 designates generally the contents of the basket.

In accordance with the present invention I provide a collapsible metallic hopper generally designated by the reference character 13. It is composed of a bottom ring 14, an intermediate or middle ring 15 and a top ring 16. These rings are seen in Figures 7, 8, and 9 and are provided with rolled edges forming beads 17. Reinforcing wires are arranged in these beads to obtain the desired rigidity in construction. The beads provide complemental stop shoulders when the sections or rings are extended. The middle or intermediate ring 15 and the top ring 16 are of plain construction as seen, whereas the bottom ring 14 is provided with a horizontal partition 18, forming a shallow pan-like receptacle 19 for the top layer 20 of the fruit. (See Figure 1).

The bottom ring is also provided at diametrically opposite points with appropriate handles 21.

In practice, the hopper is first collapsed as seen in Figure 1, whereupon the selected top layer of fruit, indicated at 20, is placed in the shallow receptacle 19. Then the sections 15 and 16 are extended to the positions seen in Figure 2, and the bulk of fruit or the like shovelled or otherwise placed therein.

With the hopper filled as shown in Figure 2, a basket is inverted and placed over the top ring 16 as represented in Figure 3. Then the basket is forced downwardly whereby to cause the hopper to collapse and force the fruit or the like into the basket, in an orderly and compact condition. Then both the hopper and the basket are inverted from the position shown in Figure 4 to the position seen in Figure 5. Then the hopper is bodily removed, leaving the basket filled and packed as shown in Figure 6, ready for reception of the cover or lid (not shown).

The use of my collapsible hopper permits more convenient and expeditious handling and packing than is possible with the old methods requiring the use of liners, which are both expensive and objectionable.

It is thought that persons familiar with packing, filling and facing fruit baskets will be able to obtain a clear understanding of the features and advantages as well as the construction and use of the invention. Therefore, a more lengthy description is regarded as unnecessary.

Minor changes in the shape, size, and rearrangement of details as well as change of materials may be resorted to within the scope of the invention as hereinafter claimed.

I claim:

1. As a new product of manufacture, a basket filling hopper of the class described comprising a collapsible cylinder composed of a plurality of at least three telescopically connected ring like members fashioned to provide a hopper adapted to contain a predetermined quantity of goods, a horizontal facer pan permanently fixed centrally in the lowest ring like member to form a shallow receptacle for the reception of selected goods for forming the top layer of the filled basket, and diametrically opposed handles projecting outwardly beyond the surface of the outermost cylinder and upwardly, the horizontal portion of the handles adapted to act as stop means for the lower edge of the second cylinder, and the upright portion of the handles adapted to be grasped simultaneously with the handles on a basket placed on the hopper, to permit conveniently and safely inverting the basket and the hopper after filling of the basket.

2. As a new product of manufacture, a basket filling hopper of the class described comprising a plurality of three or more telescoping cylinders, prevented from vertical separation by an outwardly turned bead at the top of the lowermost cylinder, an inwardly turned bead at the lower edge of the next above exterior cylinder to cooperate with it, an outwardly turned bead on the upper edge of the next above cylinder, to cooperate with an inwardly turned bead at the lower edge of the next above cylinder, and diametrically opposed handles projecting outwardly beyond the surface of the outermost cylinder and upwardly, the horizontal portion of the handles adapted to act as stop means for the lower edge of the second cylinder, and the upright portion of the handles adapted to be grasped simultaneously with the handles on a basket placed on the hopper, to permit conveniently and safely inverting the basket and hopper after filling of the basket.

3. A basket filling device of the type described comprising a plurality of at least three telescoping collapsible sections, a fixed integral facing pan secured in the innermost section below the upper edge thereof, beads on the upper and/or lower edges of the sections adapted to prevent complete separation of the sections, diametrically opposed L-shaped handles projected laterally and upwardly from the lower edge of the innermost section and outwardly of the outermost section to act as stops for the lower edge of the middle section and further to act as means, in conjunction with the handles of a basket placed on the device, for conveniently and expeditiously inverting the basket and the device.

4. A basket filling device of the type described comprising a plurality of at least three telescoping collapsible sections, a fixed integral facing pan secured in the innermost section below the upper edge thereof, beads on the upper and/or lower edges of the sections adapted to prevent complete separation of the sections, diametrically opposed L-shaped handles projected laterally and upwardly from the lower edge of the innermost section and outwardly of the outermost section to act as stops for the lower edge of the middle section and further to act as means, in conjunction with the handles of a basket placed on the device, for conveniently and expeditiously inverting the basket and the device, said device when in collapsed position having the upper edges of the sections thereof level and the lower edges at an outward and upward angle, so as to provide that the device be of the minimum height consistent with the form of its structure.

In testimony whereof I affix my signature.

FRED EHRENHARDT.